Patented Oct. 15, 1935

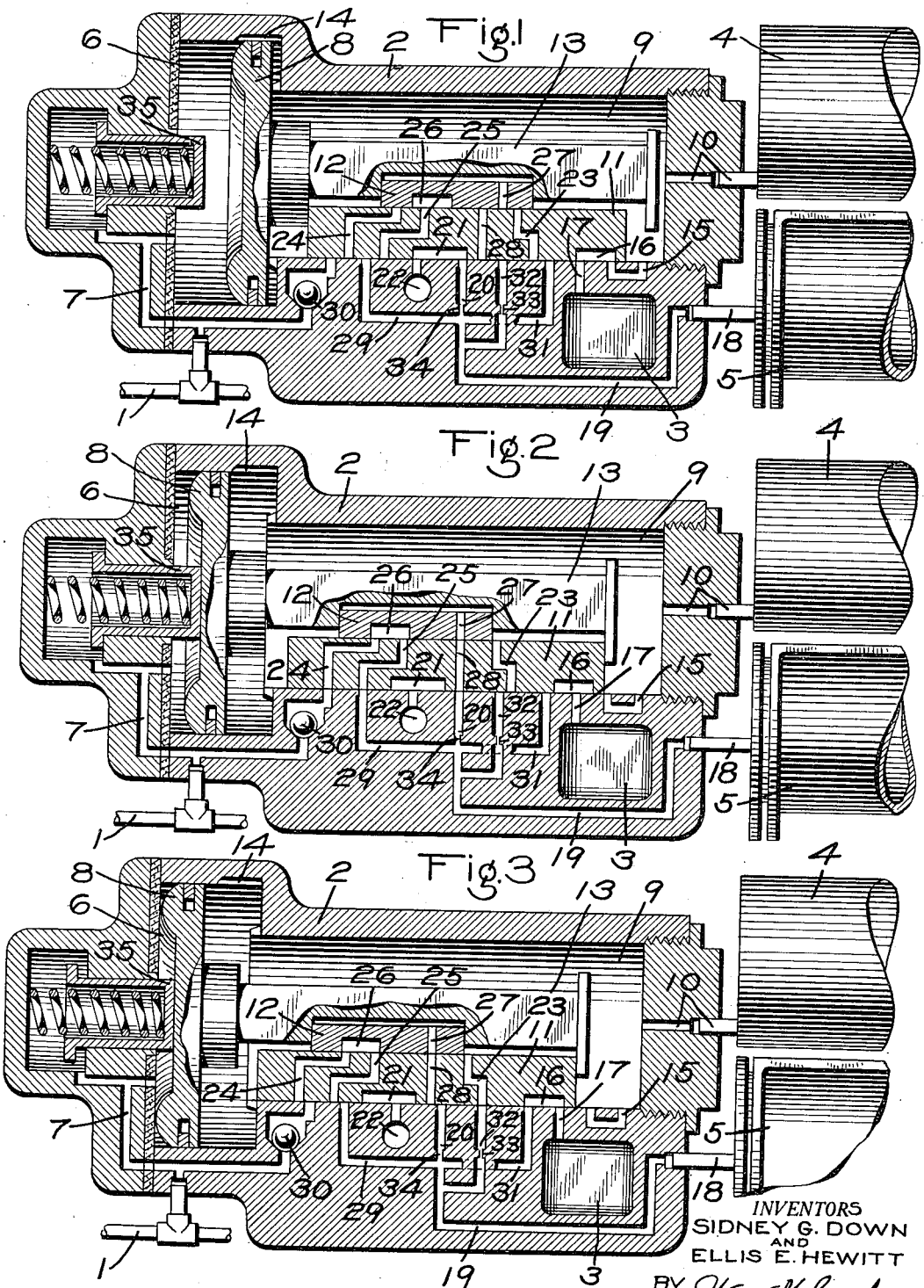

2,017,789

UNITED STATES PATENT OFFICE 2,017,789

FLUID PRESSURE BRAKE

Sidney G. Down and Ellis E. Hewitt, Edgewood, Pa., assignors to The Westinghouse Air Brake Company, Wilmerding, Pa., a corporation of Pennsylvania Application December 16, 1930, Serial No. 502,780

19 Claims. (Cl. 303—35)

This invention relates to fluid pressure brakes and more particularly to means for delaying the build up of brake cylinder pressure on cars at the head end of a train so as to prevent severe shocks, due to the running in slack in the train, when the brakes are applied on the cars at the head end of the train in advance of applying the brakes on cars at the rear end of the train.

One object of our invention is to provide improved means for delaying the build up of pressure in the brake cylinder on cars at the head end of the train, i. e., on cars where, in initiating an application of the brakes, the brake pipe pressure reduces at a faster rate than fluid under pressure is supplied from the auxiliary reservoir to the brake cylinder. This object we attain through the operation of an improved triple valve device.

Another object of our invention is to provide improved means for supplying an initial inshot of fluid under pressure to the brake cylinder when the triple valve device is being moved to and is in position to provide for the delayed build up of brake cylinder pressure, to insure that the brake cylinder piston will be moved out beyond the usual leakage grooves around the brake cylinder piston.

A further object of our invention is to provide an improved triple valve device having a brake application position in which fluid under pressure may be supplied to the brake cylinder at a predetermined rate and also having another application position in which fluid under pressure may be supplied to the brake cylinder at a slower rate, and which is controlled according to variations in brake pipe pressure.

Other objects and advantages will appear in the following more detailed description of the invention.

In the accompanying drawing; Fig. 1 is a diagrammatic view, mainly in section, of a fluid pressure brake equipment embodying our invention, the triple valve device being shown in release position; Fig. 2 is a similar view showing the triple valve device in the service application position it assumes on cars at the rear end of the train; and Fig. 3 is a similar view showing the triple valve device in the service application position it assumes on the cars at the head end of the train.

The equipment may comprise a brake pipe 1, a triple valve device 2, an inshot bulb 3, an auxiliary reservoir 4 and a brake cylinder 5.

The triple valve device 2 may comprise a casing having a piston chamber 6 connected through a passage 7 with the brake pipe 1 and containing a piston 8, and also having a valve chamber 9 connected through a passage and pipe 10 to the auxiliary reservoir 4, and containing a main slide valve 11 and a graduating slide valve 12 having limited movement relative to the main slide valve, and said valves being operable by piston 8, through the medium of a piston stem 13.

Assuming the triple valve parts to be in release position, as shown in Fig. 1, when the brake pipe 1 is charged with fluid under pressure, fluid flows from the brake pipe through passage 7 to piston chamber 6 and from thence to the auxiliary reservoir 4 by way of the usual feed groove 14, around the piston 8, and valve chamber 9. From the valve chamber 9 fluid under pressure flows to the inshot bulb 3 through a passage 15, a cavity 16 in the main slide valve 11 and a passage 17.

Further, with the triple valve device in release position, the brake cylinder 5 is connected to the atmosphere by way of a pipe 18, a passage 19, a passage 20, a choke 34 contained in the passage 20, a cavity 21 in the main slide valve 11 and an exhaust passage 22.

When an application of the brakes is effected, by causing a reduction in brake pipe pressure in the usual manner, the triple valve piston may be moved either to its normal application position, as shown in Fig. 2, or to its extreme outer application position, as shown in Fig. 3, dependent upon the extent of the differential of pressures between the brake pipe and the auxiliary reservoir.

At the head end of the train, i. e., on the cars where the rate of reduction in brake pipe pressure exceeds the rate at which auxiliary reservoir pressure can reduce into the brake cylinders through the chokes 34 when the triple valve parts reach the position as shown in Fig. 2, the triple valve pistons and connected parts will continue to move to their extreme outer position, as shown in Fig. 3, each triple valve piston so moved being opposed by the pressure of a spring-pressed stop 35. At the rear end of the train, i. e., on the cars where the rate of reduction in brake pipe pressure does not exceed the rate at which auxiliary reservoir pressure reduces into the brake cylinders through the chokes 34 when the triple valve parts reach the position as shown in Fig. 2, the resistance offered by the spring-pressed stops 35 is sufficient to maintain the pistons against further outward travel.

The triple valve piston 8, in its initial outward movement, shifts the graduating slide valve 12 relative to the main slide valve 11, so that a service port 23 in the main slide valve is uncovered, two quick service ports 24 and 25 in the main slide valve are connected through a cavity 26 in the graduating slide valve and a port 27 in the graduating slide valve registers with a service port 28 in the main slide valve. Further forward movement of the piston causes the main and graduating slide valves to be moved forwardly together.

When the triple valve parts are moved to their normal application positions, as shown in Fig. 2, the port 24 in the main slide valve registers with the passage 7 leading from the brake pipe 1 and piston chamber 6 and the port 25 registers with a passage 29 which opens into the passage 19 leading to the brake cylinder. Since the ports 24 and 25 are connected through the cavity 26 in the graduating slide valve, fluid under pressure is vented from the brake pipe to the brake cylinder, thus effecting a local reduction in brake pipe pressure so as to propagate the usual well known quick service action throughout the train.

Further, with the triple valve parts in this position, fluid under pressure is supplied from the auxiliary reservoir and connected valve chamber 9, to the brake cylinder 5 by way of port 27 in the graduating slide valve 12, port 28 in the main slide valve 11, passage 29, choke 34, passage 19 and pipe 18. It will here be noted that there is a ball check valve 30 interposed in the passage 7 which is adapted to prevent back flow of fluid from the brake cylinder 5 to the brake pipe 1. With the main slide valve 11 in normal application position, the connection from the valve chamber 9 to the inshot bulb 3 is cut off and fluid under pressure in this bulb is bottled up, so that as the auxiliary reservoir pressure reduces into the brake cylinder 5, no reduction in the pressure of fluid in the bulb will occur.

It will here be noted that on the cars of the train where the rate of reduction in brake pipe pressure does not exceed the rate of reduction of auxiliary reservoir pressure into the brake cylinder through the choke 34, the spring-pressed stop 35, which the piston engages, prevents further forward movement of the triple valve parts toward their outer application position, so that the rate of brake cylinder pressure on these cars is controlled by the flow of fluid through the choke 34.

On the cars of the train where the rate of reduction in brake pipe pressure exceeds the rate at which auxiliary reservoir pressure reduces into the brake cylinder through the choke 34 when the triple valve parts are in the position as shown in Fig. 2, the triple valve parts do not come to rest in this position, but are caused to move to their extreme outer application position against the pressure of the spring-pressed stop 35, as shown in Fig. 3. As the triple valve parts are being shifted to their outer application position, they must pass through the inner application position as shown in Fig. 2, and when they reach this inner application position, fluid under pressure flows from the valve chamber 9 to the brake cylinder 5 through port 27 in the graduating slide valve, port 28 in the main slide valve, passage 29, choke 34, passage 19 and pipe 18. Fluid under pressure is thus supplied to the brake cylinder ordinarily at such a rate and in sufficient volume to cause the usual brake cylinder piston to be moved out beyond the usual leakage grooves around the brake cylinder piston. With this connection from the valve chamber 9 to the brake cylinder thus established, the choke 34 so governs the flow of fluid therethrough as to maintain the rate of reduction in auxiliary reservoir pressure below the rate of reduction in brake pipe pressure so that auxiliary reservoir pressure will be maintained sufficiently higher than brake pipe pressure as to cause the triple valve parts to move to their extreme outer application positions against the opposing pressure of the stop 35 as shown in Fig. 3.

With the triple valve parts in their extreme outer application positions, as shown in Fig. 3, the ports 24, 25 and 28 in the main slide valve are out of registration with the passages 7, 29 and 20, respectively, and the cavity 16 in the main slide valve 11 connects the passage 17, leading from the inshot bulb 3, to a passage 31 which opens into the brake cylinder passage 19, and further, the service port 23 is in registration with a passage 32 containing a choke 33 which is open to the brake cylinder passage 19.

With the passages 17 and 31 thus connected, the normally charged inshot bulb 3 is connected to the brake cylinder, so that if the initial inshot of fluid under pressure from the auxiliary reservoir to the brake cylinder, as the several parts of the triple valve device move through their inner application position, is not sufficient to cause the brake cylinder piston to move out beyond the leakage grooves around piston, there will be a further inshot of fluid under pressure from the bulb to the brake cylinder, thus insuring the proper initial movement of the brake cylinder piston to a position beyond the leakage grooves.

With the service port 23 in registration with the passage 32, fluid under pressure from the auxiliary reservoir is supplied to the brake cylinder by way of the port 23, passage 32, choke 33, passage 19 and pipe 18, the choke 33 controlling the rate of the flow of fluid to the brake cylinder to effect an application of the brakes.

From the foregoing description it will be seen that at the rear end of the train, i. e., on the cars where the rate of reduction in brake pipe pressure does not exceed the rate of reduction in auxiliary reservoir pressure, the rate of flow of fluid to the brake cylinder in effecting an application of the brakes is controlled by the choke 34 and that at the head end of the train, i. e., on the cars where the rate of brake pipe reduction exceeds the rate of reduction in auxiliary reservoir pressure, the rate of flow of fluid to the brake cylinder is controlled by the choke 33. The flow area of the passage through the choke 33 is considerably less than that of the passage through the choke 34, so that on the cars at the head end of the train the build up in brake cylinder pressure will be delayed, and consequently, excessive shocks, due to the running in of slack, are avoided.

In releasing the brakes, the brake pipe pressure is increased in the usual manner, causing the triple valve parts to be shifted, in the usual manner, to their release position, as shown in Fig. 1, in which position, the equipment is recharged with fluid under pressure as before described.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake equipment, the combination with a brake pipe and a brake cylinder, of a triple valve device operated upon a reduction in brake pipe pressure at a certain rate to establish communication through which fluid under pressure is supplied to the brake cylinder at one rate to effect a service application of the brakes and operated upon a reduction in brake pipe pressure at a faster rate to establish communication through which fluid under pressure is supplied to the brake cylinder at a slower rate to effect a service application of the brakes.

2. In a fluid pressure brake equipment, the combination with a brake pipe and a brake cylinder, of a triple valve device operated upon a certain reduction in brake pipe pressure to establish communication through which fluid under pressure is supplied to the brake cylinder at one rate to effect an application of the brakes and operated upon a heavier reduction in brake pipe pressure to establish communication through which fluid under pressure is supplied to the brake cylinder at a slower rate to effect an application of the brakes.

3. In a fluid pressure brake equipment, the combination with a brake pipe and a brake cylinder, of a triple valve device subject to variations in brake pipe pressure for effecting the application and release of the brakes, said triple valve device comprising a plurality of valves having one position for establishing communication through which fluid under pressure is adapted to be supplied to the brake cylinder at a predetermined rate to effect an application of the brakes and having another position for establishing communication through which fluid under pressure is adapted to be supplied to the brake cylinder at a slower rate, and a movable abutment operated upon a light reduction in brake pipe pressure to shift said valves to the first mentioned position and operated upon a heavier reduction in brake pipe pressure to shift said valves to the second mentioned position.

4. In a fluid pressure brake equipment, the combination with a brake pipe and a brake cylinder, of a triple valve device subject to variations in brake pipe pressure for effecting the application and release of the brakes, said triple valve device comprising a plurality of valves having one position for establishing communication through which fluid under pressure is adapted to be supplied to the brake cylinder at a predetermined rate to effect a service application of the brakes and having another position for establishing communication through which fluid under pressure is adapted to be supplied to the brake cylinder at a slower rate to effect a service application of the brakes, and a piston operated upon a reduction in brake pipe pressure at a slow rate for shifting said valves to the first mentioned position and operated upon a reduction in brake pipe pressure at a faster rate to shift said valves to the second mentioned position.

5. In a fluid pressure brake equipment, the combination with a brake pipe and a brake cylinder, of a triple valve device subject to variations in brake pipe pressure for effecting the application and release of the brakes, said triple valve device comprising a plurality of valves having one position for establishing communication through which fluid under pressure is adapted to be supplied to the brake cylinder at a predetermined rate to effect an application of the brakes and having another position for establishing communication through which fluid under pressure is adapted to be supplied to the brake cylinder at a slower rate, and a piston operated upon a reduction in brake pipe pressure at a slow rate for shifting said valves to the first mentioned position and operated upon a reduction in brake pipe pressure at a faster rate for shifting said valves to the second mentioned position.

6. In a fluid pressure brake equipment, the combination with a brake pipe, a brake cylinder, a reservoir charged with fluid under pressure and an inshot chamber charged with fluid under pressure, of a valve device operative upon the effecting of a reduction in brake pipe pressure at a certain rate to establish communication through which fluid under pressure is supplied from said inshot chamber to the brake cylinder at a fast rate and to establish communication through which fluid under pressure is supplied from said reservoir to the brake cylinder at a comparatively slow rate to effect an application of the brakes and operative upon the effecting of a reduction in brake pipe pressure at a slower rate to establish communication through which fluid under pressure is supplied from said reservoir to the brake cylinder at a faster rate to effect an application of the brakes and to prevent the flow of fluid from said inshot chamber to the brake cylinder.

7. In a fluid pressure brake equipment, the combination with a brake pipe, a brake cylinder, and a chamber charged with fluid under pressure, of a valve device operative upon the effecting of a heavy reduction in brake pipe pressure to establish communication through which fluid under pressure flows from said chamber to the brake cylinder and to establish communication through which fluid under pressure is supplied from a fluid pressure supply source to the brake cylinder at a slow rate, and operative upon a lighter reduction in brake pipe pressure to establish communication through which fluid under pressure is supplied from said source to the brake cylinder at a fast rate and to maintain said chamber disconnected from the brake cylinder.

8. In a fluid pressure brake equipment, the combination with a brake pipe, a brake cylinder, an auxiliary reservoir charged with fluid under pressure from the brake pipe and a chamber charged with fluid under pressure from the auxiliary reservoir, of a triple valve device having a brake applying position to which it is moved upon the effecting of a heavy reduction in brake pipe pressure and in which fluid under pressure is supplied from said chamber to the brake cylinder and having another brake applying position to which it is moved upon the effecting of a lighter reduction in brake pipe pressure and in which said chamber is maintained disconnected from the brake cylinder.

9. In a fluid pressure brake equipment, the combination with a brake pipe, a brake cylinder, an auxiliary reservoir charged with fluid under pressure from the brake pipe and a chamber charged with fluid under pressure from the auxiliary reservoir, of a triple valve device having a brake applying position to which it is moved upon the effecting of a heavy reduction in brake pipe pressure and in which fluid under pressure is supplied from said chamber to the brake cylinder and having another brake applying position to which it is moved upon the effecting of a lighter reduction in brake pipe pressure and in which said chamber is disconnected from the auxiliary reservoir and is maintained disconnected from the brake cylinder.

10. In a fluid pressure brake equipment, the combination with a brake pipe, a brake cylinder, an auxiliary reservoir and a brake cylinder inshot chamber, of a triple valve device having a normal release position in which said chamber is charged with fluid under pressure from the auxiliary reservoir and having a service application position in which said chamber is disconnected from the auxiliary reservoir and fluid under pressure is supplied from said chamber to the brake cylinder and having another service application position in which said chamber is disconnected from the auxiliary reservoir and brake cylinder, said triple valve device being operated to its several service application positions upon variations in brake pipe pressure.

11. In a fluid pressure brake equipment, the combination with a brake pipe and a brake cylinder, of a triple valve device operated upon a certain reduction in brake pipe pressure to establish communication through which fluid under pressure is supplied to the brake cylinder at one rate to effect an application of the brakes and operated upon a different reduction in brake pipe pressure to establish communication through which fluid under pressure is supplied to the brake cylinder at a slower rate to effect an application of the brakes, and a yieldable stop defining the first mentioned application position.

12. In a fluid pressure brake equipment, the combination with a brake pipe, auxiliary reservoir, and brake cylinder, of a triple valve device comprising a piston subject to the opposing pressures of the brake pipe and auxiliary reservoir, and valve means movable by said piston upon a reduction in brake pipe pressure to a position in which fluid under pressure is supplied to the brake cylinder and movable by said piston to another position in which the flow of fluid from the auxiliary reservoir to the brake cylinder is restricted when brake pipe pressure reduces at a faster rate than fluid is supplied from the auxiliary reservoir to the brake cylinder in the first mentioned position.

13. In a fluid pressure brake equipment, the combination with a brake pipe, a brake cylinder, and an auxiliary reservoir, of a valve device subject to brake pipe pressure and movable upon a reduction in brake pipe pressure to either one of two positions in each of which positions fluid under pressure is supplied from said auxiliary reservoir to the brake cylinder to effect an application of the brakes, the flow of fluid to the brake cylinder in one position being more restricted than in the other position, said valve device when being moved toward the more restricted brake cylinder supply position passing through the other position and establishing communication through which an initial inshot of fluid under pressure is supplied from the auxiliary reservoir to the brake cylinder.

14. In a fluid pressure brake equipment, the combination with a brake pipe, of a brake cylinder, and a brake controlling valve mechanism having one position for establishing a communication through which fluid under pressure is supplied to the brake cylinder at a certain rate to effect a service application of the brakes and for establishing a communication through which fluid under pressure is vented from the brake pipe and having another position in which both of said communications are closed and in which another communication is established through which fluid under pressure is supplied to the brake cylinder at a slower rate to effect a service application of the brakes.

15. In a fluid pressure brake equipment, the combination with a brake pipe and a brake cylinder, of a triple valve device subject to variations in brake pipe pressure for effecting the application and release of the brakes, said triple valve device comprising a plurality of valves having one position for establishing communication through which fluid under pressure is adapted to be supplied to the brake cylinder at a predetermined rate to effect an application of the brakes and for establishing communication through which fluid under pressure is vented from the brake pipe, and having another position for closing said communications and for establishing communication through which fluid under pressure is adapted to be supplied to the brake cylinder at a slower rate, and a movable abutment operated upon a reduction in brake pipe pressure at a slow rate to shift said valves to the first mentioned position and operated upon a reduction in brake pipe pressure at a faster rate for shifting said valves to the second mentioned position.

16. In a fluid pressure brake equipment, the combination with a brake pipe and a brake cylinder, of a triple valve device subject to variations in brake pipe pressure for effecting the application and release of the brakes, said triple valve device comprising a plurality of valves having one position for establishing communication through which fluid under pressure is adapted to be supplied to the brake cylinder at a predetermined rate to effect an application of the brakes and for establishing communication through which fluid under pressure is vented from the brake pipe to the brake cylinder, and having another position for closing said communications and for establishing communication through which fluid under pressure is adapted to be supplied to the brake cylinder at a slower rate, and a movable abutment operated upon a reduction in brake pipe pressure at a slow rate to shift said valves to the first mentioned position and operated upon a reduction in brake pipe pressure at a faster rate for shifting said valves to the second mentioned position.

17. In a fluid pressure brake equipment, the combination with a brake pipe, a brake cylinder and an auxiliary reservoir charged with fluid under pressure, of a valve device having an inner service application position and an outer service application position, said valve device being subject to the opposing pressures of the brake pipe and auxiliary reservoir and being operative to the first mentioned position upon a reduction in brake pipe pressure at a slow rate and being operative to the second mentioned position upon a reduction in brake pipe pressure at a faster rate, means operative when the valve device is in the first mentioned service position to supply fluid under pressure to the brake cylinder at a certain rate, and means operative when the valve device is in the second mentioned service position to supply fluid under pressure to the brake cylinder at two different rates.

18. In a fluid pressure brake equipment, the combination with a brake pipe, a brake cylinder and an auxiliary reservoir charged with fluid under pressure, of a valve device having an inner service application position and an outer service application position, said valve device being subject to the opposing pressures of the brake pipe and auxiliary reservoir and being operative to the first mentioned position upon a reduction in brake pipe pressure at a slow rate and being operative to the second mentioned position upon a reduction in brake pipe pressure at a faster rate, means operative when the valve device is in the first mentioned service position to supply fluid under pressure to the brake cylinder at a certain rate, and means operative when the valve device is in the second mentioned service position to supply fluid under pressure to increase the brake cylinder pressure a predetermined amount at a fast rate and to supply fluid under pressure to the brake cylinder to then increase the brake cylinder pressure at a slower rate.

19. In a fluid pressure brake equipment, the combination with a brake pipe, a brake cylinder and an auxiliary reservoir charged with fluid under pressure, of a valve device having an inner service application position and an outer service application position, said valve device being subject to the opposing pressures of the brake pipe and auxiliary reservoir and being operative to the first mentioned position upon a reduction in brake pipe pressure at a slow rate and being operative to the second mentioned position upon a reduction in brake pipe pressure at a faster rate, means operative when the valve device is in the first mentioned service position to supply fluid under pressure to the brake cylinder to increase the brake cylinder pressure at a certain rate, and means operative when the valve device is in the second mentioned service position to supply fluid under pressure to increase the brake cylinder pressure a predetermined amount at a fast rate and to supply fluid under pressure to the brake cylinder to then increase the brake cylinder pressure at a rate slower than that at which the brake cylinder pressure is increased when the valve device is in the first mentioned service position.

SIDNEY G. DOWN.
ELLIS E. HEWITT.